Patented Mar. 27, 1945

2,372,337

UNITED STATES PATENT OFFICE 2,372,337

METHOD OF PREPARING STARCH DERIVATIVES

Eugene Pacsu and James W. Mullen, II, Princeton, N. J., assignors to Research Corporation, New York, N. Y., a corporation of New York No Drawing. Application April 7, 1941, Serial No. 387,360

7 Claims. (Cl. 260—209)

An object of the present invention is the provision of a method for the production of colloidal solutions or pastes of starch in organic solvents or media which colloidal solutions or pastes may be used for the production of derivatives, such as the esters and ethers of the starch and for other purposes.

We have worked out a method for preparing colloidal solutions or pastes of starch in tertiary nitrogenous bases, such as pyridine, quinoline, isoquinoline, etc., and have shown that the resulting colloidal solutions or pastes are capable of use in reactions for the preparation of esters and ethers of starch.

The invention will be illustrated hereinafter with reference to the use of pyridine as the solvent for the starch. It is noted at this point that the invention is applicable to starches from various sources, such as cereal starches from corn and wheat and root starches from yams and potatoes.

Attempts to gelatinize native starch directly in tertiary nitrogenous bases such as pyridine and quinoline have not been successful, since even upon boiling the starch in such solvents, the starch granules remain unburst and the starch remains unreactive toward etherification and esterification reagents. If first the starch granules are burst, it is possible to prepare colloidal solutions or pastes of the starch in such solvents which are suitable for the preparation of derivatives We have found it to be possible to prepare the desired solution by boiling the starch directly in a mixture of water and pyridine and continuing the boiling with distillation and with additions of pyridine if necessary until the water has been eliminated, thereby producing a colloidal solution or paste of the starch in the pyridine. We have shown that treatment of starch with pyridine-water mixtures which after allowance for the water content of the starch, are richer in pyridine than the azeotropic mixture (60 parts by weight of pyridine to 40 parts by weight of water) will not gelatinize to starch. We prefer however to use mixtures containing at least 50 parts by weight of pyridine to 50 parts by weight of water as being most economical of material and procedure since replacement of the water by pyridine can then advantageously be accomplished by distillation, taking advantage of the azeotrope formed between pyridine and water, boiling at 92–93° C. The replacement of the water by pyridine may be carried out by making repeated small additions of pyridine or by making one large addition of pyridine to the solution.

In a specific instance, 10 parts by weight of corn starch was mixed with 50 parts by weight of water and 50 parts by weight of pyridine and heated at 100° C. with stirring until, after about 20 minutes, a clear thin paste resulted. To this paste 350 parts by weight of pyridine was added and thoroughly mixed, and the mixture was then distilled until the temperature of the vapors coming off had risen from an initial temperature of 92° C. (the boiling temperature of the pyridine-water azeotrope) to 115° C. (the boiling temperature of pyridine). In the specific instance described above, and with only moderately efficient fractionation, complete elimination of water from the mixture was accomplished by the removal of 250 parts of the original 400 parts of pyridine.

Similar results are obtained by the substitution of quinoline for the pyridine but, because of the higher boiling temperature of quinoline as well as its immiscibility with water, the water is more easily and quickly replaced or eliminated.

The starch content of the pyridine solution or paste is readily reactive with known esterification and etherification reagents, such as acetic anhydride, acetyl chloride, benzoyl chloride, anhydrides of the higher fatty acids, benzoic anhydride, phthalic anhydride, succinic anhydride, benzyl chloride and triphenyl chloromethane. The polyfunctional esterification and etherification reagents are particularly of interest in view of the production therefrom of starch derivatives which may be capable of forming useful net polymers, water soluble salts, etc. The starch, gelatinized in tertiary bases, is, as stated, highly reactive toward the esterification and etherification reagents and is found to be trifunctional toward such reagents, that is to say, all three hydroxyl groups of the starch molecule enter into reaction and form the tri esters and ethers.

The starch derivatives obtainable by esterification and etherification thereof in the solutions or pastes of starch in the tertiary nitrogenous bases have not been fully investigated. They are in general, however, thermoplastic, yielding clear glasslike products when separated. They appear, therefore, to be of interest in the preparation of plastics and resins suitable for molding, coating, preparation of adhesives, etc.

The following are illustrative examples of the production of esters and ethers of the starch.

To the solution or paste of the whole starch produced by mixing 1 part of starch with 10 parts of an equal mixture of water and pyridine, heating at 100° C. and stirring for about 20 minutes, adding 35 parts of pyridine and distilling to remove the water, thereby producing a paste of 1 part of starch in about 15 parts of pyridine, 5 moles of acetic anhydride was added, and the mixture shaken overnight at room temperature. The result was a clear, slightly colored solution which, when poured into cold water with vigorous stirring, yielded a white, fibrous precipitate of starch triacetate. The yield was about 100%. The same results are obtained in a shorter time if the acylation reaction is hastened by heating. Identical results are obtained with pastes of starch in quinoline.

The pyridine solution or paste described in the foregoing example was mixed with 5 moles of benzoyl chloride. Upon shaking overnight at room temperature or stirring in a water bath, the mixture gives a clear solution which yields a white precipitate of starch tribenzoate when poured into water. The yield is 100%.

5 moles of benzyl chloride was added to the pyridine solution or paste described above of 1 mole of starch and the mixture was shaken overnight. The reaction mixture contained a large amount of crystals, probably pyridine hydrochloride, which dissolved on addition of water to the reaction mixture, and at the same time a rubbery mass precipitated which, on drying, yielded a horn like mass. The yield calculated as the benzyl ether of starch amounted to 90.5% of the theoretical yield. The above concentrations are, of course, approximate. The use of stronger equipment to facilitate thorough mixing permits the use of more economical concentrations.

Similar results are obtained with solutions or pastes of the whole starch in other tertiary nitrogenous bases as solvents and with other esterification and etherification agents.

In the foregoing description, we have referred to solutions or pastes of the starch because of the uncertainty as to the correct description of the materials: In starch chemistry the word "paste" designates an aqueous gel or fine starch suspension over a very wide viscosity range. The low viscosity gels or thin-boiling starches are colloidal solutions which approach true solutions, whereas the higher viscosity gels are actually thick jellies. The word "paste" embraces both extremes as well as the intermediate stages.

The pyridine gels range from clear solutions, when the pyridine contains a small amount of water (about 4%), to thick jellies or colloidal suspensions when water is absent, and the starch concentration is high. Both types are equally reactive, but the presence of water is undesirable in the manufacture of esters and ethers on a large scale since it consumes a part of the reagent.

The solubility of pyridine in water is advantageous in the separation of a water insoluble starch derivative such as acetylated starch from the reaction mixture by simply washing out the pyridine with water. The volatility of certain pyridine salts (e. g. the hydrochloride, acetate, etc.) may also be utilized to remove the pyridine and acid from the reaction mixture.

We claim:

1. Method for the production of a colloidal solution of starch which comprises gelatinizing the starch in a mixture of water and heterocyclic tertiary introgenous base and eliminating the water from the mixture by distillation.

2. Method as defined in claim 1 in which the base is pyridine.

3. Method as defined in claim 1 in which the base is a quinoline.

4. Method of forming esters and ethers of starch which comprises forming a colloidal solution of starch in a substantially anhydrous heterocyclic tertiary nitrogenous base as defined in claim 1 and reacting it with an agent of the group consisting of organic esterifying and etherifying agents.

5. Method as defined in claim 4 in which the nitrogenous base is pyridine.

6. Method as defined in claim 4 in which the nitrogenous base is quinoline.

7. Method for the production of a colloidal solution of starch in substantially anhydrous pyridine which comprises forming a solution of the starch in a mixture of pyridine and water containing up to 60 per cent by weight of pyridine and removing the water from the solution by distillation of the azeotropic mixture thereof with pyridine.

EUGENE PACSU.
JAMES W. MULLEN, II.